(12) United States Patent
McNabb et al.

(10) Patent No.: US 11,794,242 B2
(45) Date of Patent: Oct. 24, 2023

(54) DRY METAL ALLOYING COMPOSITIONS AND RELATED METHODS

(71) Applicant: Montana Technological University, Butte, MT (US)

(72) Inventors: Riley Leonard McNabb, Butte, MT (US); Peter Andrew Lucon, Butte, MT (US); Nathan James Huft, Butte, MT (US); T Oscar Winsor, Shoreline, WA (US)

(73) Assignee: Montana Technological University, Butte, MT (US)

( * ) Notice: Subject to any disclaimer, the term of this patent is extended or adjusted under 35 U.S.C. 154(b) by 0 days.

(21) Appl. No.: 17/401,258

(22) Filed: Aug. 12, 2021

(65) Prior Publication Data

US 2022/0111438 A1    Apr. 14, 2022

Related U.S. Application Data

(60) Provisional application No. 63/119,420, filed on Nov. 30, 2020, provisional application No. 63/064,758, filed on Aug. 12, 2020.

(51) Int. Cl.
| | |
|---|---|
| *B22F 1/065* | (2022.01) |
| *B22F 10/28* | (2021.01) |
| *B33Y 10/00* | (2015.01) |
| *B33Y 70/00* | (2020.01) |
| *B33Y 80/00* | (2015.01) |

(52) U.S. Cl.
CPC ............. *B22F 1/065* (2022.01); *B22F 10/28* (2021.01); *B22F 2301/15* (2013.01); *B22F 2301/35* (2013.01); *B22F 2998/10* (2013.01); *B22F 2999/00* (2013.01); *B33Y 10/00* (2014.12); *B33Y 70/00* (2014.12); *B33Y 80/00* (2014.12)

(58) Field of Classification Search
None
See application file for complete search history.

(56) References Cited

U.S. PATENT DOCUMENTS 5,516,483 A    5/1996   Shivanath et al.

FOREIGN PATENT DOCUMENTS

| CN | 106378519 A | * | 2/2017 | ......... B23K 35/3066 |
|---|---|---|---|---|
| CN | 106378519 | | 1/2019 | |
| WO | 2006072162 A1 | | 7/2006 | |

OTHER PUBLICATIONS

Majumdar, Jyotsna Dutta, and Indranil Manna. Laser-Assisted Fabrication of Materials, Springer, Berlin, Germany, 2012, pp. 225-226. (Year: 2012).*

(Continued)

*Primary Examiner* — Anthony M Liang
(74) *Attorney, Agent, or Firm* — Midtown Intellectual Property, PC; CA Schlecht

(57) ABSTRACT

The present disclosure provides a blended powder comprising a first ferroalloy powder and at least one iron powder or second ferroalloy powder. The present disclosure also provides a method for dry metal alloying, comprising combining powder comprising a first ferroalloy powder and at least one iron powder or second ferroalloy powder, and mixing the combined powders to form a blended powder.

8 Claims, 6 Drawing Sheets

(56) References Cited

OTHER PUBLICATIONS

A. Vanarase, O. J., F. J. Muzzio, S. L. Coguill, and P. Lucon, "JANNAF 36th Propellant and Explosives Development and Characterization Joint Subcommittee Meeting, Dec. 2010," in RESONANTACOUSTIC® Mixing; Uniform Distribution of Minor Materials During Powder Mixing, 2010, No. December.

F. Bartolomeu et al., "Predictive models for physical and mechanical properties of Ti6Al4V produced by Selective Laser Melting," Mater. Sci. Eng. A, vol. 663, pp. 181-192, 2016.

J. G. Osorio and F. J. Muzzio, "Evaluation of resonant acoustic mixing performance," Powder Technol., vol. 278, pp. 46-56, 2015.

J. G. Osorio, E. Hernández, R. J. Romañach, and F. J. Muzzio, "Characterization of resonant acoustic mixing using near-infrared chemical imaging," Powder Technol., vol. 297, pp. 349-356, 2016.

J. Whaley (Resodyn), "Mixing Length in RAM," in Resodyn Technical Interchange 2019, 2019.

M. Marigo, D. L. Cairns, M. Davies, A. Ingram, and E. H. Stitt, "A numerical comparison of mixing efficiencies of solids in a cylindrical vessel subject to a range of motions," Powder Technol., vol. 217, pp. 540-547, 2012.

P. C. Collins, R. Banerjee, and H. L. Fraser, "The influence of the enthalpy of mixing during the laser deposition of complex titanium alloys using elemental blends," Scr. Mater., vol. 48, pp. 1445-1450, 2003.

R. E. Schafrik, "Manufacture of TiAl by extrusion of blended elemental powders," Metall. Trans. B, vol. 7, No. 4, pp. 713-716, 1976.

R. M. Clayton, "The use of elemental powder mixes in laser-based additive manufacturing," Missouri University of Science and Technology, 2013.

A. L. Schaeffler, "Constitution diagram for stainless steel weld metal," Met. Prog., vol. 56, No. 11, p. 680-680B, 1949.

A. Lawley, "Atomization," Encyclopedia of Materials: Science and Technology. pp. 387-392, 2001.

A. R. Miedema, F. R. de Boer, and R. Boom, "Model Predictions for the Enthalpy of Formation of Transition Metal Alloys," Calphad, vol. 1, No. 4, pp. 341-359, 1977.

A. Takeuchi and A. Inoue, "Calculations of Mixing Enthalpy and Mismatch Entropy for Ternary Amorphous Alloys.pdf," Mater. Trans. JIM, vol. 41, No. 11, pp. 1372-1378, 2000.

A. Takeuchi and A. Inoue, "Classification of Bulk Metallic Glasses by Atomic Size Difference , Heat of Mixing and Period of Constituent Elements and Its Application to Characterization of the Main Alloying Element," Mater. Trans., vol. 46, No. 12, pp. 2817-2829, 2005.

American Society for Testing and Materials, "ASTM A240: Standard Specification for Chromium and Chromium-Nickel Stainless Steel Plate , Sheet , and Strip for Pressure Vessels and for General Applications," ASTM Int., vol. I, p. 12, 2004.

ASTM International, "ASTM Standard B215-15,"Standard Practices for Sampling Metal Powders," ASTM International, West Conshohocken, PA, 2015, www.astm.org," ASTM International, vol. 02.05. pp. 35-41, 2015.

ASTM International, "ASTM Standard B243-13,"Standard Terminology of Powder Metallurgy," ASTM International, West Conshohocken, PA, 2013, www.astm.org," ASTM International, vol. 02.05. pp. 47-54, 2013.

B. Seaholm (Resodyn), "Resodyn Acoustic Mixers—Control Features," in Resodyn Technical Interchange 2019, 2019.

C. Pasquini, "Near infrared spectroscopy: Fundamentals, practical aspects and analytical applications," J. Braz. Chem. Soc., vol. 14, No. 2, pp. 198-219, 2003.

D. Kotecki and T. Siewert, "WRC-1992 constitution diagram for stainless steel weld metals: a modification of the WRC-1988 diagram," Weld J, vol. 71, No. 5, pp. 171-178, 1992.

D. Lin et al., "Rheological and thermal debinding properties of blended elemental Ti-6Al4V powder injection molding feedstock," Powder Technol., vol. 311, pp. 357-363, 2017.

F. Bartolomeu et al., "316L stainless steel mechanical and tribological behavior—A comparison between selective laser melting, hot pressing and conventional casting," Addit Manuf., vol. 16, pp. 81-89, 2017.

F. J. Muzzio, M. Llusa, C. L. Goodridge, N. H. Duong, and E. Shen, "Evaluating the mixing performance of a ribbon blender," Powder Technol., vol. 186, No. 3, pp. 247-254, 2008.

GlenMills, "Turbula Shaker Mixer Image." [Online]. Available: https://glenmills.com/powder-mixingblending/gclid=CjwKCAjw8MD7BRArEiwAGZsrBX3J2_hEFk9T0B_ILahlw7od0SQ9UIG2Umyvet0d2R_REarebAwlBoCJdMQAvD_BwE.

I. Tolosa, F. Garciandía, and F. Zubiri, "Study of mechanical properties of AISI 316 stainless steel processed by 'selective laser melting', following different manufacturing strategies," Int. J. Adv. Manuf. Technol., vol. 51, pp. 639-647, 2010.

Pharmachine, "V-Shaped Blender Image." [Online]. Available: https://www.ipharmachine.com/high-capacity-v-blender-dry-powder-mixer-blendingmachine?affiliate=adwords&gclid=CjwKCAjw8MD7BRArEiwAGZsrBUFpAsEvtcjEYE0So_oXTxkyvqxgdxyVc9S14iWROpkk1cvrHbF25RoCKFIQAvD_BwE.

J. A. Cherry, H. M. Davies, S. Mehmood, and N. P. Lavery, "Investigation into the effect of process parameters on microstructural and physical properties of 316L stainless steel parts by selective laser melting," pp. 869-879, 2015.

J. A. Slotwinski, E. J. Garboczi, P. E. Stutzman, C. F. Ferraris, S. S. Watson, and M. A. Peltz, "Characterization of Metal Powders Used for Additive Manufacturing," J. Res. Natl. Inst. Stand. Technol., vol. 119, p. 460, 2014.

J. Breitbach (Resodyn) and S. Trant (Resodyn), "Batch Mixing of Solids," in Resodyn Technical Interchange 2019, 2019.

J. Lippold, "Solidification behavior and cracking susceptibility of pulsed-laser welds in austenitic stainless steels," Weld J., vol. 73, No. 6, p. 129, 1994.

J. Whaley (Resodyn), "Calculating Mixing Power," in Resodyn Technical Interchange 2019, 2019.

J. Whaley (Resodyn), "Engaging Multiple Transducers," in Resodyn Technical Interchange 2019, 2019.

J.-E. Smugeresky, D. Dawson, and S. N. Laboratories, "New Titanium Alloys for Blended Elemental Powder Processing," 1981.

K. I. Schwendner, R. Banerjee, P. C. Collins, C. A. Brice, and H. L. Fraser, "Direct laser deposition of alloys from elemental powder blends," vol. 45, pp. 1123-1129, 2001.

L. Bolzoni, P. G. Esteban, E. M. Ruiz-Navas, and E. Gordo, "Mechanical behaviour of pressed and sintered titanium alloys obtained from prealloyed and blended elemental powders," J. Mech. Behav. Biomed. Mater., vol. 14, pp. 29-38, 2012.

L. Yan, X. Chen, W. Li, J. Newkirk, and F. Liou, "Direct laser deposition of Ti-6Al-4V ? from elemental powder blends," Rapid Prototyp. J., vol. 22, No. 5, pp. 2-9, 2016.

M. L. Fernández-sánchez, Optical Atomic Emission Spectrometry—Inductively Coupled Plasma☆, 3rd ed., No. October. Elsevier Inc., 2018.

M. Marigo, D. L. Cairns, M. Davies, A. Ingram, and E. H. Stitt, "Developing mechanistic understanding of granular behaviour in complex moving geometry using the Discrete Element Method Part B: Investigation of fl ow and mixing in the Turbula® mixer," Powder Technol., vol. 212, No. 1, pp. 17-24, 2011.

M. Simonelli et al., "A comparison of Ti-6Al-4V in-situ alloying in Selective Laser Melting using simply-mixed and satellited powder blend feedstocks," Mater. Charact., vol. 143, No. Sep. 2018, pp. 118-126, 2018.

P. Rawn, "3D Printing of 316L Stainless Steel and Its Effect on Microstructure and Mechanical Properties by Penn Rawn A thesis submitted in partial fulfillment of the requirements for the degree of Masters of Science in Metallurgical Engineering and Minera l Process," Montana Tech, 2017.

R. J. Davey, J. M. Wilgeroth, and A. O. Burn, "Processing Studies of Energetic Materials using Resonant Acoustic Mixing Technology," Propellants, Explos. Pyrotech., pp. 1-10, 2019.

Resodyn, "Resodyn Resonant Acoustic Mixer Image." [Online]. Available: https://resodynmixers.com/products/labram-2/.

(56) References Cited

OTHER PUBLICATIONS

S. Ewald, F. Kies, S. Hermsen, M. Voshage, C. Haase, and J. H. Schleifenbaum, "Rapid Alloy Development of Extremely High-Alloyed Metals Using Powder Blends in Laser Powder Bed Fusion," Materials (Basel)., vol. 12, No. 10, pp. 1-15, 2019.

S. Karnati, F. L. Liou, and J. W. Newkirk, "Characterization of copper-nickel alloys fabricated using laser metal deposition and blended powder feedstocks," Int. J. Adv.Manuf. Technol., vol. 103, pp. 239-250, 2019.

S. L. Bonchin and U. States, "Atomic Emission Spectrometry Methods and Instrumentation," vol. 1, pp. 58-64, 2017.

S. M. Gandhi and B. C. Sarkar, Sampling and Analysis. Essentials of Mineral Exploration and Evaluation, Chapter 9—Sampling and Analysis. 2016.

T. DebRoy et al., "Additive manufacturing of metallic components—Process, structure and properties," Prog. Mater. Sci., vol. 92, pp. 112-224, 2018.

T. K. Lee, J. H. Kim, and S. K. Hwang, "Direct Consolidation of Gamma-TiAl—Mn—Mo from Elemental Powder Mixtures and Control of Porosity through a Basic Study of Powder Reactions," Metall. Mater. Trans. A, vol. 28A, No. December, pp. 2723-2729,1997.

Takeda, W. M. Steen, and D. R. F. West, "Laser Cladding With Mixed Powder Feed.," LIA (Laser Inst. Am., vol. 43, No. 1984, pp. 151-158, 1985.

U. S. EPA. 1994, "Method 200.7: Determination of Metals and Trace Elements in Water and Wastes by Inductively Coupled Plasma-Atomic Emission Spectrometry," Revision 4.4. Cincinnati, OH.

J. V. Shah, V. Karde, C. Ghoroi, and J. Y. Y. Heng, "Influence of particle properties on powder bulk behaviour and processability," Int. J Pharm., vol. 518, No. 1-2, pp. 138-154,2017.

W. E. Frazier, "Metal Additive Manufacturing: A Review," vol. 23, No. June, pp. 1917-1928, 2014.

W. Sigmund, V. Maneeratana, and S. hau Hsu, "Powder Characterization," Ceram. Sci. Technol., vol. 3-4, No. Nov. 2015, pp. 337-368, 2013.

Y. Li and D. Gu, "Parametric analysis of thermal behavior during selective laser melting additive manufacturing of aluminum alloy powder," Mater. Des., vol. 63, pp. 856-867, 2014.

Z. Sun, X. Tan, S. Tor, and W. Y. Yeong, "Selective laser melting of stainless steel 316L with low porosity and high build rates," JMADE, vol. 104, pp. 197-204, 2016.

Hope et al. "Resonant Acoustic Mixing and its applications to energetic materials". Conference:New Trends in Research of Energetic Materials (NTREM), Czech Republic, (2015), pp. 134-143.

International Search Report and Written Opinion, PCT/US2021/045830, dated Dec. 3, 2021.

Madhav, S., "5 Things You Need to Know About Reduced Iron Powder", Jul. 30, 2019, retrieved from https://imp-india.com/5-things-you-need-to-know-about-reduced-iron-powder/ on Aug. 29, 2022.

\* cited by examiner

DRY METAL ALLOYING COMPOSITIONS AND RELATED METHODS

This application claims the benefit of priority of U.S. Provisional Patent Application Ser. No. 63/064,758 filed Aug. 12, 2020, and Application Ser. No. 63/119,420 filed Nov. 30, 2020, the disclosures of which are incorporated by reference in their entireties for all purposes.

This invention was made with government support under cooperative agreements W911NF-20-2-0163 and W911NF-15-2-0020 awarded by the Army Research Lab (ARL). The government has certain rights in the invention.

Metal powder additive manufacturing (AM), such as selective laser melting (SLM), directed energy deposition (DED), and electron beam melting (EBM), produces single custom parts in less time, with less material waste, and similar mechanical properties than traditional manufacturing methods, such as casting. Powder-based AM processes, however, are limited by the properties of pre-alloyed powders themselves. As a result, powder-based AM processes can produce single custom parts on-demand only if the pre-alloyed powder of the desired composition is available. If a particular composition is required, the user must wait for the steel manufacturer to produce, powder, and ship the specific alloy.

Selective Laser Melting (SLM) is a metal AM for producing three-dimensional (3D) parts from metallic powder feedstock. A mixture of elemental and ferroalloy powders can be alloyed in-situ during deposition. Cost savings and versatility are significant advantages to mixing elemental and ferroalloyed powders instead of pre-alloyed powders in the SLM process.

Dry metal alloying (DMA) has previously been shown to produce some alloys for AM. In the past, only representative stainless steel (SS) alloys have been successfully deposited, and these are from prealloyed powders that already comprised the targeted alloy. Following the methods disclosed here, elemental mixing allows the end-user to fine-tune the composition of metal powder feedstock as needed and not rely on manufacturers to produce pre-alloyed powders of specific composition. Metals are prealloyed with iron to make their melting points more similar during AM. The disclosed method puts new material development in the hands of the research and the small manufacturer.

The present disclosure provides a blended powder comprising a first ferroalloy powder and at least one iron powder or second ferroalloy powder. In certain embodiments, the first ferroalloy powder comprises one or more chosen from ferronickel, ferrosilicon, ferrochromium, ferromolybdenum, and ferromanganese. In certain embodiments, the blended powder comprises the iron powder comprising one or more chosen from high-purity iron powder, cast iron powder, and high-carbon iron powder. In certain embodiments, the blended powder comprises a second ferroalloy powder comprising one or more chosen from ferronickel, ferrosilicon, ferrochromium, ferromolybdenum, and ferromanganese, that is not the same as the first ferroalloy powder. That is, when the blended powered comprises a first and second ferroalloy power, the first ferroalloy powder is different than the second ferroalloy powder. In certain embodiments, the blended powder further comprises nickel powder.

In certain embodiments, the blended powder has a homogeneity index ($HI_{mix}$) of less than 1, wherein $HI_{mix}$ is a ratio of relative standard deviation (RSD) of measured concentration of an element across multiple extracted powder samples (% $RSD_{Mix}$) to a theoretical RSD based on allowable concentration limits set for the element (% $RSD_{C_T}$). In certain embodiments, the $HI_{mix}$ is less than 0.9, such as less than 0.8, less than 0.7, less than 0.6, less than 0.5, less than 0.4, less than 0.3, less than 0.2, or less than 0.1.

Homogeneity may be assessed using many methods know in the art, including inductively-coupled plasma optical omission spectrometry (ICP-OES). An acid digestion methodology was developed that allowed ICP-OES to determine the concentration and mix uniformity of elements in a 316L SS pre-alloyed powder and elemental mix.

The present disclosure also provides a method for dry metal alloying, comprising combining a first ferroalloy powder and at least one iron powder or second ferroalloy powder, and mixing the combined powders to form a blended powder. In certain embodiments, the method further comprises additively manufacturing with the blended powder, for example via selective laser melting (3D printing). In certain embodiments, the mixing is done on an acoustic mixer. In certain embodiments, the method further comprises selecting the proportion of each powder based on a target composition and the composition of each powder. In certain embodiments, the bulk composition of the blended powder is determined by the weighted average of the composition of a first ferroalloy powder and at least one iron powder or second ferroalloy powder.

The present disclosure further provides a blended powder formed by the method described herein. The present disclosure also provides a product of additive manufacture produced from any method described herein or produced from any blended powder described herein.

Additional embodiments and features are set forth in part in the description that follows, and in part will become apparent to those skilled in the art upon examination of the specification, or may be learned by the practice of the embodiments discussed herein. A further understanding of the nature and advantages of certain embodiments may be realized by reference to the remaining portions of the specification and the drawings, which forms a part of this disclosure.

BRIEF DESCRIPTION OF THE DRAWINGS

The disclosure will be readily understood by the following detailed description in conjunction with the accompanying drawings, wherein like reference numerals designate like structural elements. The drawings provide exemplary embodiments or aspects of the disclosure and do not limit the scope of the disclosure.

The present disclosure may be understood by reference to the following detailed description, taken in conjunction with the drawings as described above. For illustrative clarity, certain elements in various drawings may not be drawn to scale, may be represented schematically or conceptually, or otherwise may not correspond exactly to certain physical configurations of embodiments.

DETAILED DESCRIPTION

Provided herein is method of dry metal alloying to make existing and new alloys. This disclosure includes blended powders comprising an iron powder and at least one ferroalloy powder.

Figure 1:
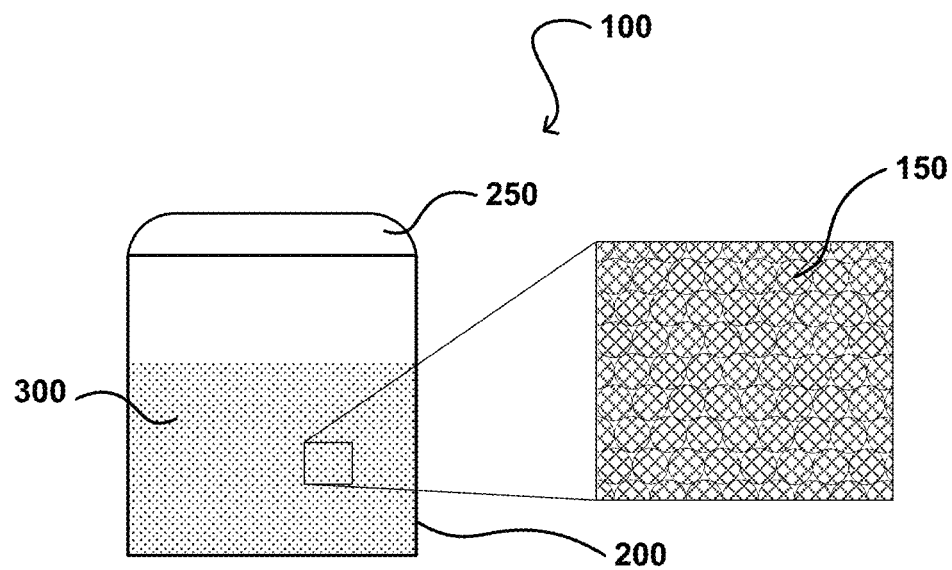
FIG. 1 depicts the prior art additive manufacturing using pre-alloyed 316L stainless steel powder to form 316L stainless steel.

The state of the art for additive manufacturing powder is uniform manufacture from a single alloy, for example, ANSI 316L 100 (FIG. 1). Here, a single type of powder 300 is placed in a processing vessel 200 with a lid 250. The powder 300 is pre-alloyed because the individual powder particles are already at the desired end-use material's desired composition of 316L dry metal alloy powder 150.

Figure 2:
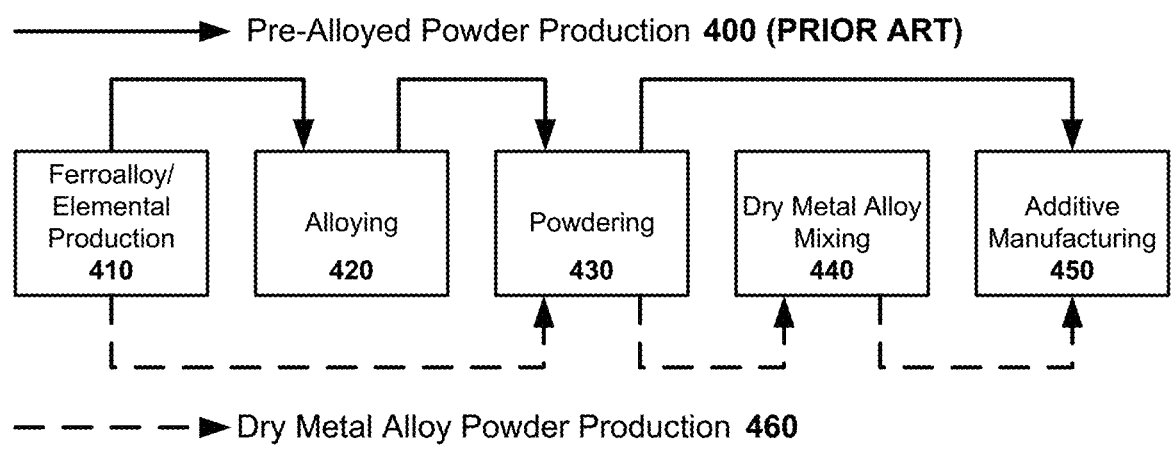
FIG. 2 depicts the process flow for current pre-alloyed powder production (prior art) along with the DMA powder production disclosed herein.

Referring to FIG. 2, the current state-of-the-art processing for additive manufacturing metal powder 400 is taking ferroalloy or elemental materials 410 and making them into a pre-alloy composition 420. The alloy composition 420 is then powdered 430 to the desired particle shape and size distribution, for example by gas atomization, centrifugal gas atomization, or comminution methods. This powder is used in additive manufacturing 450.

In contrast, the process disclosed herein 460 produces a dry metal alloy powder. Instead of alloying the ferroalloy or elemental materials 410, they are powdered 430 then mixed as a dry metal alloy 440. The blended powder this then used for additive manufacture 450.

In certain embodiments, the blended powder comprises a first ferroalloy powder and a second ferroalloy powder. In certain embodiments, the blended powder comprises a first ferroalloy powder and an iron powder. In certain embodiments, the blended powder comprises a first ferroalloy powder, a second ferroalloy powder, and an iron powder.

In certain embodiments, the iron powder comprises one or more chosen from high-purity iron, cast iron, and high-carbon iron. In certain embodiments, the blended powder further comprises nickel powder.

"Ferroalloy" refers to various alloys of iron with a high proportion of one or more other elements such as manganese (Mn), aluminum (Al), or silicon (Si). They are used in the production of steels and alloys. Ferroalloys impart distinctive qualities to steel and cast iron or serve important functions during production and are, therefore, closely associated with the iron and steel industry. Examples of ferroalloys include, but are not limited to, ferroaluminum, ferroboron, ferrocerium, ferrochromium, ferromagnesium, ferromanganese, ferromolybdenum, ferroniobium, ferronickel, nickel pig iron, ferrophosphorus, ferrosilicon, ferrosilicon magnesium, ferrotitanium, ferrouranium, ferrovanadium, and ferrotungsten. In certain embodiments, the ferroalloy comprises one or more chosen ferronickel, ferrosilicon, ferrochromium, ferromolybdenum, and ferromanganese. In certain embodiments, the ferroalloy comprises ferronickel. In certain embodiments, the ferroalloy comprises ferrosilicon. In certain embodiments, the ferroalloy comprises ferrochromium. In certain embodiments, the ferroalloy comprises ferromolybdenum. In certain embodiments, the ferroalloy comprises ferromanganese.

"Dry metal alloying" means blending metal powders with different compositions, including at least one binary or higher metal alloy powder, to yield a mixture with a given bulk composition for various applications. DMA allows for fine-tuning of material properties within a specification. Thus, an end-user can tune materials to their application while conforming to relevant standards. For example, alloy steels contain elements (e.g., carbon, chromium, manganese, etc.) for hardenability. Generally, higher concentrations of these hardening elements increase hardenability and reduce weldability. As a result, DMA can produce standard alloys tailored for either hardenability or weldability.

Tailoring for hardenability requires mixing feedstock powders in appropriate proportions to produce a bulk composition that contains concentrations of hardening elements near-maximum specification values. Tailoring for weldability requires mixing feedstock powders in appropriate proportions to produce a bulk composition that contains concentrations of hardening elements near minimum specification values. In both cases, the same feedstock materials are used—in different proportions—and the bulk composition of the alloy complies with the applicable material standard.

Feedstock powders for DMA may be either elemental metal powders (e.g., iron or nickel powders) or powdered alloys of the solvent metal. Powdered alloys are necessary when the physical properties of the alloying element substantially vary from those of the solvent metal.

Using powdered alloys of the base metal is advantageous for matching physical properties among the blended feedstock powder's constituent powders. Two fundamental physical properties of interest for the DMA method are density and melting temperature.

Pre-alloyed powder with spherical morphology is currently the most used feedstock in powder-based AM. Powders comprising smooth spherical particles have a better flowability and resist agglomeration compared to rough or irregular powders, which mechanically interlock. In addition, spherical particles pack more efficiently than irregular or rough particles, resulting in a higher bulk density. A higher bulk density of a feedstock powder leads to a better surface finish and product quality.

Rapid vaporization as the melt pool approaches the base metal's boiling point frequently limits the melt pool's temperature to less than the boiling point. Consequently, the melt pool may not reach a sufficiently high temperature to melt the pure alloying element. Although the pure alloying element may dissolve into the base metal if given sufficient time, laser melting may be too fast for dissolution. An alloy of the base metal and alloying element may melt at a sufficiently low temperature and eliminate time-consuming dissolution.

In certain embodiments, alloying steel with molybdenum is an example of significantly varying physical properties between the solvent metal (iron) and the alloying element (molybdenum). Following the methods disclosed herein, molybdenum is introduced into the iron alloy as ferromolybdenum. Doing so lowers the melting point of molybdenum so that it easily dissolves into the base iron matrix during additive manufacture.

Molybdenum has a melting temperature of about 2890 K (2617° C.). The melting temperature is significantly higher than that of iron (about 1808 K, 1535° C.) and approaches iron's boiling point (about 3134 K, 2861° C.). Rapid vaporization typically limits an iron melt pool's temperature to less than molybdenum's melting point. Unlike pure molybdenum, ferromolybdenum melts around 2175 K (1902° C.) and mixes into the melt pool.

Proportions of each feedstock powder are determined by the desired (target) composition and the composition of each feedstock powder. The bulk composition of the blended powders is determined by the weighted average of the composition of the feedstock powders, where its relative prevalence weights the composition of each feedstock powder in the powder mixture.

The composition of deposited metal is determined by the composition of the blended powder, various mass losses that occur during melting (oxidation and/or vaporization), and dilution with the substrate (base metal) or previously deposited layers. Losses to oxidation and/or vaporization are not predicted by simple means. The compositional effects of dilution can be approximated by taking the weighted average of the compositions of the newly deposited material and the substrate (base metal) or previously deposited layers, weighting the compositions by their relative prevalence in the melt pool.

The size, shape, density, particle interactions, and cohesion of the materials affect the powders' particle segregation (demixing). Gravity and agitation are the main drivers of the segregation of the powders. By keeping the powders at a similar size and density, segregation is minimized. Therefore, the closer the sizes and densities are for each of the different constituents, the mixed powders will be less likely to segregate (demix). The differences in densities and particle sizes are chosen by application and specific mixing methods.

Figure 3:
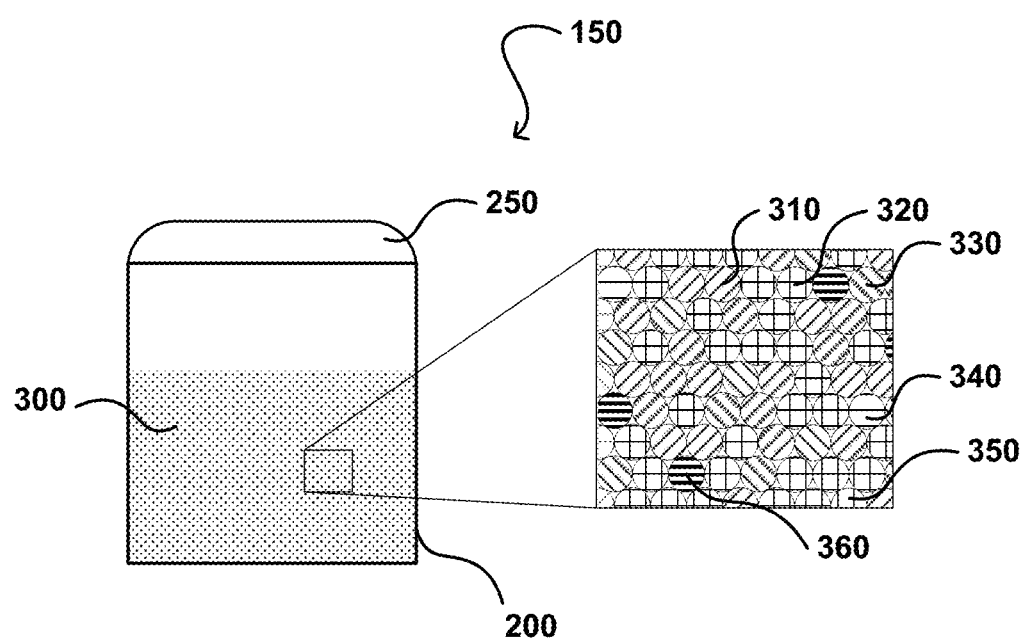
FIG. 3 depicts dry metal alloying to form AISI 316L.

Referring to FIG. 3, in certain embodiments, ANSI 316L 150 is made from dry metal alloying by combining ferrochromium 310, high purity iron 320, ferronickel 330, ferromanganese 340, ferrosilicon 350, and ferromolybdenum 360 in a vessel 200 with a lid 250 and blending the powders 300 to homogeneity.

Figure 4:
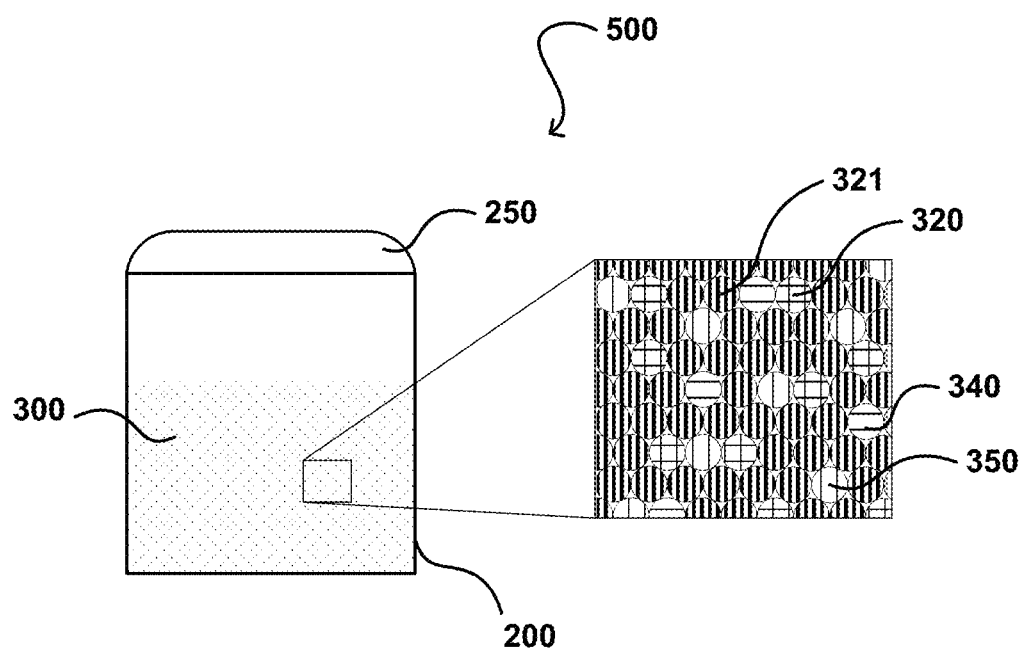
FIG. 4 depicts dry metal alloying to form G3000 cast iron.

A common material for use in vehicle applications is G3000 cast iron. Referring to FIG. 4, in certain embodiments, G3000 cast iron 500 is made by dry metal alloying by combining high carbon iron 321, high purity iron 320, ferromanganese 340, and ferrosilicon 350 in a vessel 200 with a lid 250 and blending the powders 300 to homogeneity.

Figure 5:
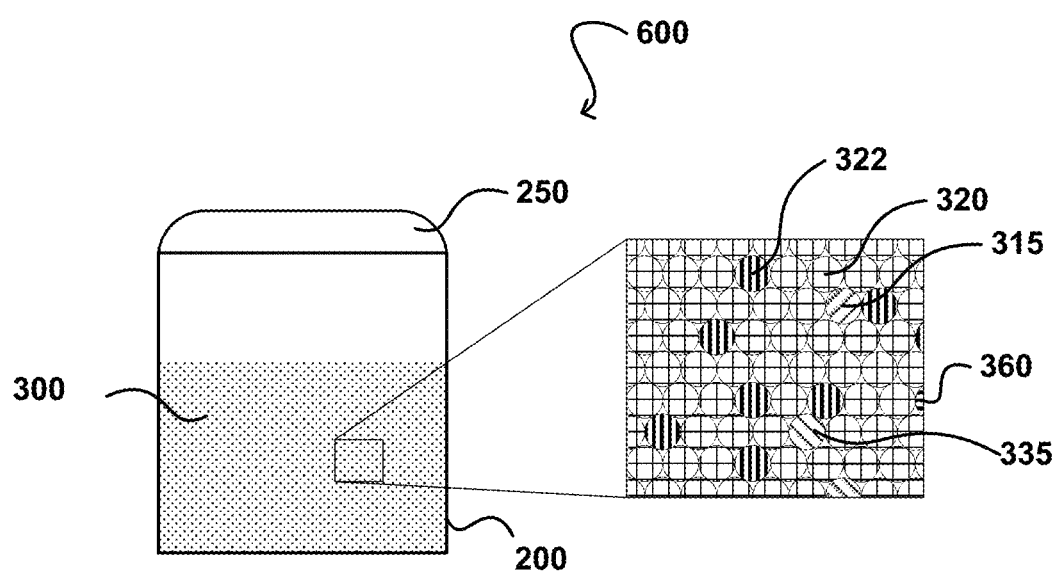
FIG. 5 depicts dry metal alloying to form AISI 4340.

High-strength steels are commonly used throughout the industry. Referring to FIG. 5, in certain embodiments, ANSI 4340 600 is formed from dry metal alloying by combining high purity cast iron 322, high purity iron 320, low-carbon ferrochromium 315, ferromolybdenum 360, and nickel 335 in a vessel 200 with a lid 250 and blending the powders 300 to homogeneity.

Figure 6:
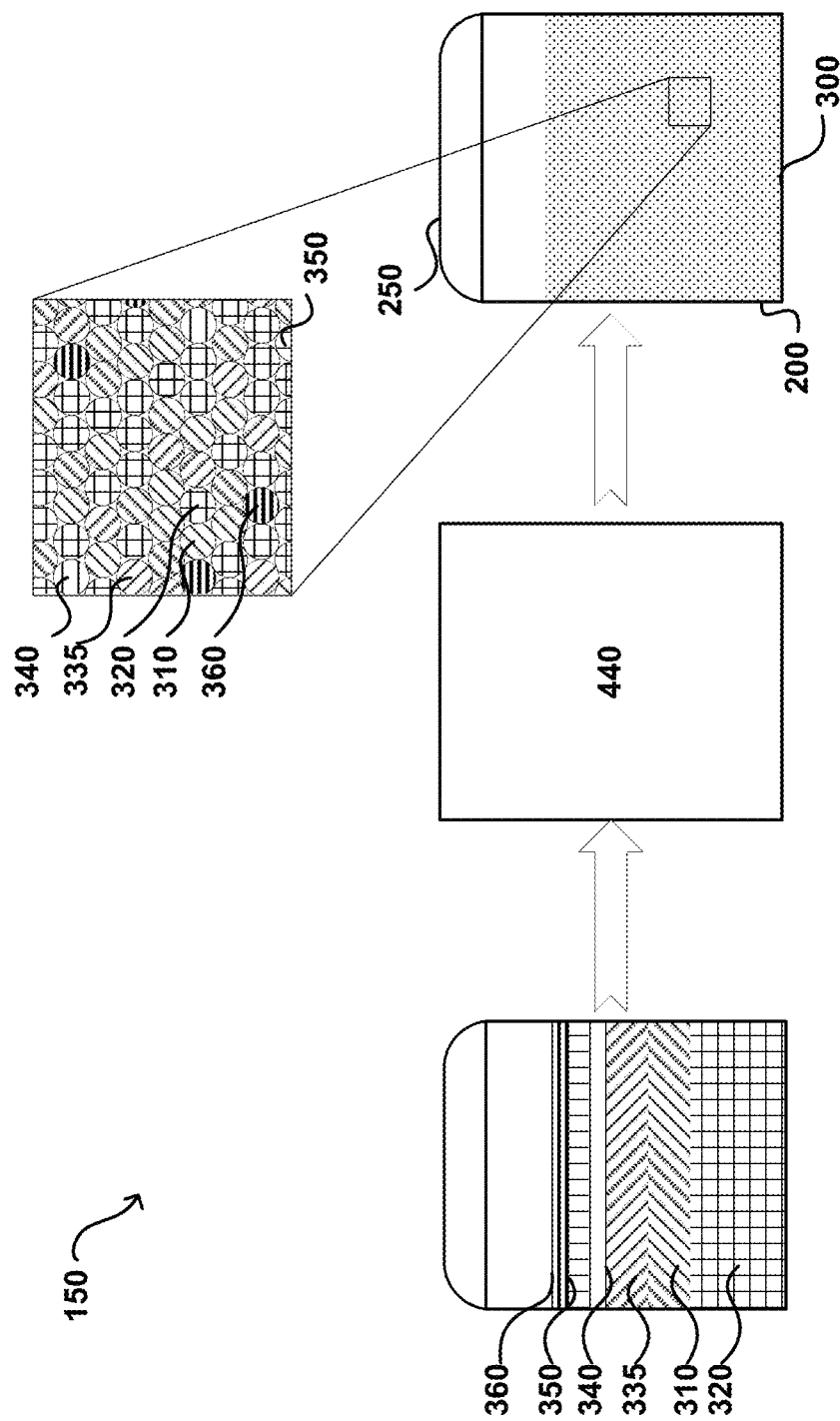
FIG. 6 depicts elemental and ferroalloy powders combined, mixed, and formed via DMA into AISI 316L.

Referring to FIG. 6, in certain embodiments, ANSI 316L is made by dry metal alloying by combining and mixing 440 ferrochromium 310, high purity iron 320, nickel 335, ferromanganese 340, ferrosilicon 350, and ferromolybdenum 360 in a vessel 200 with a lid 250 and blending the powders 300 to homogeneity.

In certain embodiments, the blend powder comprises 50-96 wt. % iron powder, up to 1 wt. % ferromanganese powder, 1-30 wt. % ferrochromium powder, 1-15 wt. % nickel powder, and up to 5 wt. % ferromolybdenum powder. In certain embodiments, the blend powder comprises 50-96 wt. % iron powder, such as between 50 wt. % and 55 wt. %, between 55 wt. % and 60 wt. %, between 60 wt. % and 65 wt. %, between 65 wt. % and 70 wt. %, between 70 wt. % and 75 wt. %, between 75 wt. % and 80 wt. %, between 80 wt. % and 85 wt. %, between 85 wt. % and 90 wt. %, and between 90 wt. % and 95 wt. % iron powder. In certain embodiments, the blend powder comprises more than 50 wt. % iron. In certain embodiments, the blend powder comprises less than 96 wt. %.

In certain embodiments, the blend powder comprises up to 1 wt. % ferromanganese powder. In certain embodiments, the blend powder comprises 1-30 wt. % ferrochromium powder, such as between 1 wt. % and 5 wt. %, between 5 wt. % and 10 wt. %, between 10 wt. % and 15 wt. %, between 15 wt. % and 20 wt. %, between 20 wt. % and 25 wt. %, between 25 wt. % and 30 wt. %, ferrochromium powder. In certain embodiments, the blend powder comprises more than 1 wt. % ferrochromium powder. In certain embodiments, the blend powder comprises less than 30 wt. % ferrochromium powder.

In certain embodiments, the blend powder comprises 1-15 wt. % nickel powder, such as between 1 wt. % and 5 wt. %, between 5 wt. % and 10 wt. %, and between 10 wt. % and 15 wt. % nickel powder. In certain embodiments, the blend powder comprises more than 1 wt. % nickel powder. In certain embodiments, the blend powder comprises less than 15 wt. % nickel powder. In certain embodiments, the blend powder comprises up to 5 wt. % ferromolybdenum powder, such as 0.5 wt. %, 1 wt. %, 2 wt. %, 3 wt. %, 4 wt. %, or 5 wt. %. ferromolybdenum powder.

In certain embodiments, the blended powder comprise 50-60 wt. % high purity iron powder, up to 1 wt. % ferromanganese powder, 20-30 wt. % low-carbon ferrochromium powder, 10-15 wt. % nickel powder, and 3-5 wt. % ferromolybdenum powder. In certain embodiments, the blended powder comprises 50-60 wt. % high purity iron powder. In certain embodiments, the blended powder comprises up to 1 wt. % ferromanganese powder. In certain embodiments, the blended powder comprises 20-30 wt. % low-carbon ferrochromium powder. In certain embodiments, the blended powder comprises 10-15 wt. % nickel powder. In certain embodiments, the blended powder comprises 3-5 wt. % ferromolybdenum powder.

In certain embodiments, the blend powder comprises 58.92 wt. % high purity iron powder, 0.94 wt. % ferromanganese powder, 24.29 wt. % low-carbon ferrochromium powder, 12 wt. % nickel powder, and 3.85 wt. % ferromolybdenum powder. In certain embodiments, the blend powder comprises 58.92 wt. % high purity iron powder. In certain embodiments, the blend powder comprises 0.94 wt. % ferromanganese powder. In certain embodiments, the blend powder comprises 24.29 wt. % low-carbon ferrochromium powder. In certain embodiments, the blend powder comprises 12 wt. % nickel powder. In certain embodiments, the blend powder comprises 3.85 wt. % ferromolybdenum powder.

In certain embodiments, the blend powder comprises 80-90 wt. % high purity iron powder, 5-10 wt. % high-carbon iron powder, up to 1 wt. % ferromanganese powder, 1-2 wt. % low-carbon ferrochromium powder, 1-2 wt. % nickel powder, and up to 1 wt. % ferromolybdenum powder. In certain embodiments, the blend powder comprises 80-90 wt. % high purity iron powder. In certain embodiments, the blend powder comprises 5-10 wt. % high-carbon iron powder. In certain embodiments, the blend powder comprises up to 1 wt. % ferromanganese powder. In certain embodiments, the blend powder comprises 1-2 wt. % low-carbon ferrochromium powder. In certain embodiments, the blend powder comprises 1-2 wt. % nickel powder. In certain embodiments, the blend powder comprises up to 1 wt. % ferromolybdenum powder.

In certain embodiments, the blend powder comprises 86.53 wt. % high purity iron powder, 9.21 wt. % high-carbon iron powder, 0.94 wt. % ferromanganese powder, 1.14 wt. % low-carbon ferrochromium powder, 1.8 wt. % nickel powder, and 0.39 wt. % ferromolybdenum powder. In certain embodiments, the blend powder comprises 86.53 wt. % high purity iron powder. In certain embodiments, the blend powder comprises 9.21 wt. % high-carbon iron powder. In certain embodiments, the blend powder comprises 0.94 wt. % ferromanganese powder. In certain embodiments, the blend powder comprises 1.14 wt. % low-carbon ferrochromium powder. In certain embodiments, the blend powder comprises 1.8 wt. % nickel powder. In certain embodiments, the blend powder comprises 0.39 wt. % ferromolybdenum powder.

The mixing is performed by for example, acoustic mixers, turbula mixers, tumble blenders, ribbon blender, and paddle mixers. The mixing process is performed until the DMA mixture is homogenous. In certain embodiments, acoustic mixing homogenously mixes the material, and unmixing does not occur, unlike other powder mixers. For example, 316L SS powders was mixed on a Resodyne LabRAM II acoustic mixer at an acceleration of 70 g for 60 second in a 75% full vessel.

Generally, the degree of homogeneity for additive manufacturing is defined from the desired material composition (user-specific or standard defined), melt pool size (50 μm to 20,000 μm), particle sizes (20 nm to 1,000 μm), and intermixing of the layer depths.

In certain embodiments, the blended powder is characterized by the homogeneity index ($HI_{mix}$). $HI_{mix}$ compares the relative standard deviation (RSD) of the measured concentration of the element of interest across multiple extracted powder samples (% $RSD_{Mix}$) to a theoretical RSD based on the allowable concentration limits set (% $RSD_{C_T}$):

$$HI_{Mix} = \left( \frac{\% \ RSD_{Mix}}{\% \ RSD_{C_T}} \right)$$

% $RSD_{C_T}$ is calculated using the upper and lower concentration limits for a given element, thereby establishing a maximum allowable % RSD. If % $RSD_{Mix}$ is less than % $RSD_{C_T}$, $HI_{mix}$ is less than unity, indicating that the DMA powder batch is sufficiently well-mixed to conform to the specified composition limits throughout its entirety. If tighter compositional control is desired, the acceptable $HI_{mix}$ may be reduced further. For example, if the concentration of a given element is desired to be near the lower specification limit, the acceptable $HI_{mix}$ max be reduced to a value significantly less than unity to accommodate the tighter compositional tolerance.

Figure 7:
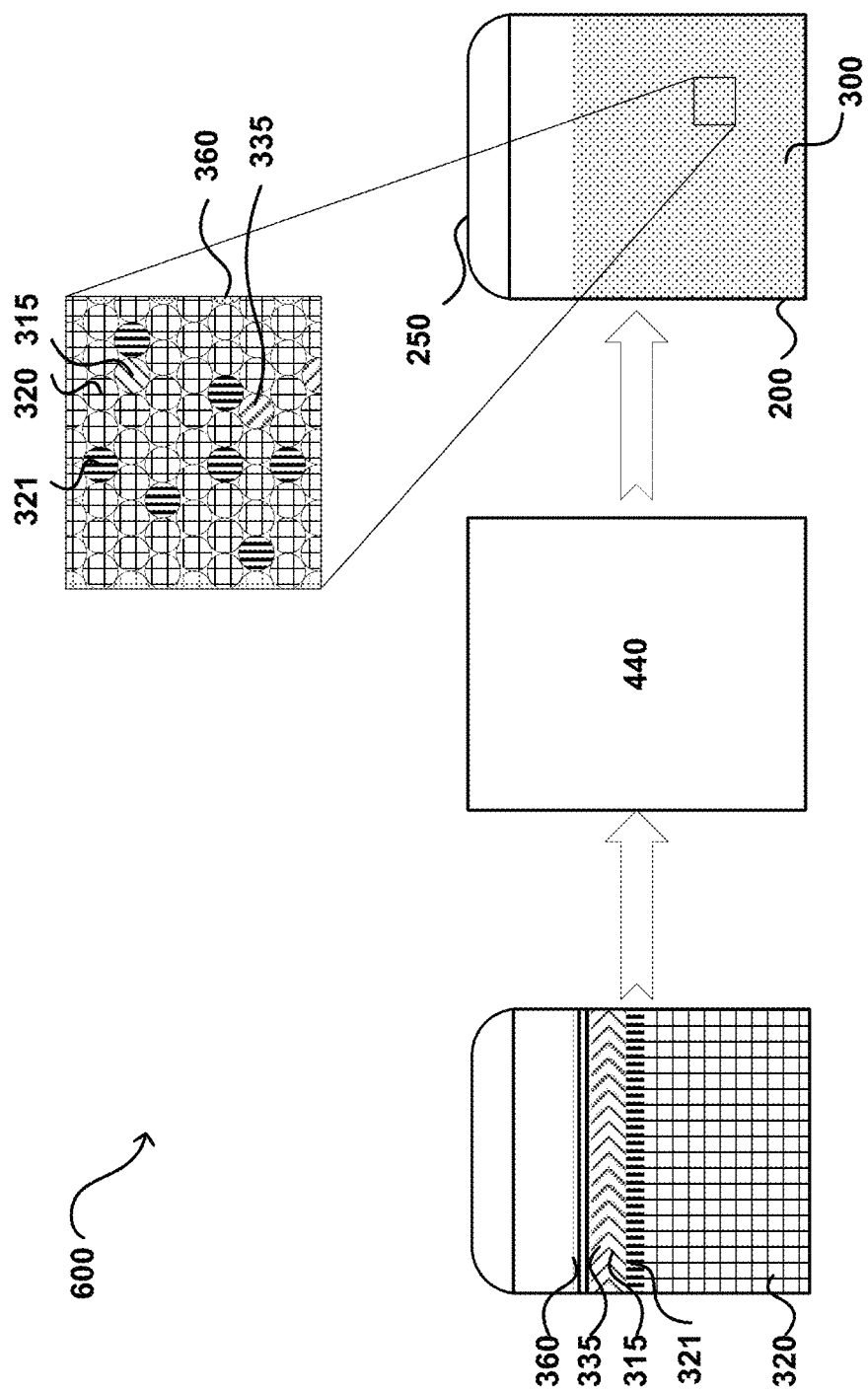
FIG. 7 depicts elemental and ferroalloy powders combined, mixed, and formed via DMA into AISI 4340.
Figure 8:
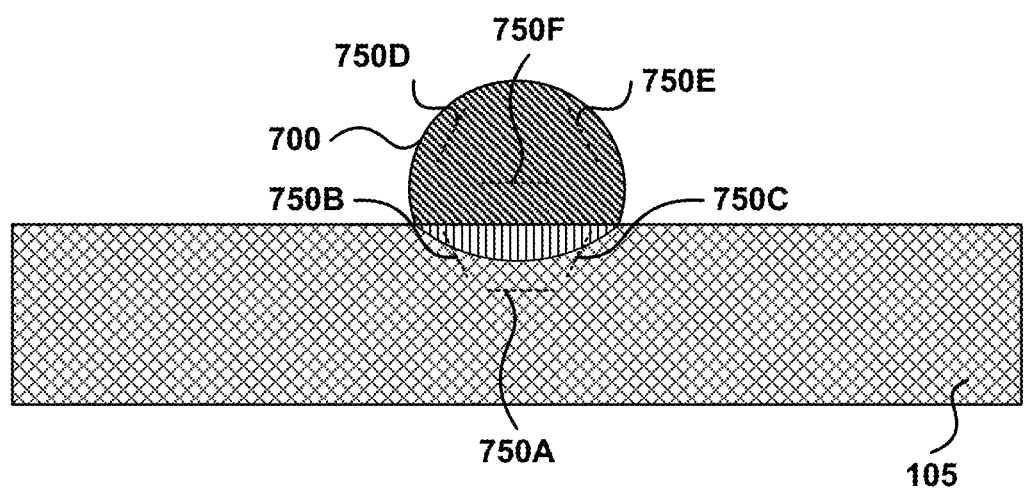
FIG. 8 depicts a single melt pool analyzed with SEM line scans. SEM line scans 750D, 750E, and 750F analyze the melt pool compositions. Line scans 750B and 750C characterized the transition of the melt pool to the base metal, while line scan 750A characterized the base metal.

In certain embodiments, ANSI 4340 is made by dry metal alloying low carbon ferrochromium, high purity iron, nickel, high carbon iron, and ferromolybdenum (FIG. 7). As in other embodiments, the constituents are then added to a processing container or vessel to be mixed. The mixing is in a mixer until homogenous.

EXAMPLES

The following examples are included to demonstrate certain embodiments of the disclosure. It should be appreciated by those of skill in the art that the techniques disclosed in the examples represent techniques discovered by the inventors to function well in the practice of the disclosure. Those of skill in the art should, however, in light of the present disclosure, appreciate that many changes can be made in the specific embodiments disclosed and still obtain a like or similar result without departing from the spirit and scope of the disclosure, therefore all matter set forth is to be interpreted as illustrative and not in a limiting sense.

TABLE 1

| | Reference numerals |
|---|---|
| 100 | 316L powder |
| 105 | 316L base material |
| 150 | 316L dry metal alloy powder |
| 200 | processing vessel |
| 250 | vessel lid |
| 300 | powder |
| 310 | ferrochromium |
| 315 | low-carbon ferrochromium |
| 320 | iron |
| 321 | carbon iron |
| 322 | cast iron |
| 330 | ferronickel |
| 335 | nickel |
| 340 | ferromanganese |
| 350 | ferrosilicon |
| 360 | ferromolybdenum |
| 400 | pre-alloyed powder production |
| 410 | ferroalloy or elemental production |
| 420 | steel alloy production |
| 430 | powder production |
| 440 | dry metal alloy mixing method |
| 450 | additive manufacturing |
| 460 | dry metal alloy powder production. |
| 500 | G3000 cast iron dry metal alloy powder |
| 600 | 4340 dry metal alloy powder |
| 700 | solidified melt pool |
| 750A | SEM Line Scan A |
| 750B | SEM Line Scan B |
| 750C | SEM Line Scan C |
| 750D | SEM Line Scan D |
| 750E | SEM Line Scan E |
| 750F | SEM Line Scan F |

Recognizing that standardized alloys can and will vary, the examples below demonstrate that DMA can produce alloys conforming to standardized specifications. The included examples are based on the specified feedstock compositions. Feedstock compositions may vary among batches. A person of skill in the art can readily calculate and adjust the mix proportions to compensate for feedstock variations. Feedstock compositions are specified as single values in the included examples. Suitable feedstock composition ranges for the examples are listed in Table 2.

TABLE 2

| | Suitable feedstock composition ranges | | | | | |
|---|---|---|---|---|---|---|
| | Fe (wt. %) | C (wt. %) | Mn (wt. %) | Cr (wt. %) | Ni (wt. %) | Mo (wt. %) |
| High Purity Iron | 99+ | — | — | — | — | — |
| High Carbon Iron | Balance | 3-5 | — | — | — | — |
| Ferromanganese | Balance | 0.75 max | 50-95 | — | — | — |

TABLE 2-continued

Suitable feedstock composition ranges

| | Fe (wt. %) | C (wt. %) | Mn (wt. %) | Cr (wt. %) | Ni (wt. %) | Mo (wt. %) |
|---|---|---|---|---|---|---|
| Low Carbon Ferrochromium | Balance | 0.015 max | — | 40-100 | — | — |
| Nickel/Ferronickel | 0-50 | — | — | — | Balance | — |
| Ferromolybdenum | Balance | 0.10 max | — | — | — | 60-75 |

Processing variation may also require adjusting constituent proportions. For example, variations in power density during melting may cause elements to vaporize in varying amounts. Lack of atmospheric control during melting may also necessitate adjusting feedstock proportions to compensate for the loss of elements to oxidation. A person of skill in the art is able to make the adjustment using methods and equipment available in the art.

Example 1

AISI 316L with the target composition given in Table 3 was fabricated using dry metal alloying (DMA) using the powders in Table 4 mixed in the proportions in Table 5.

TABLE 3

Target chemistry for AISI 316L stainless steel produced by DMA

| Element | wt. % |
|---|---|
| Carbon | 0.015 |
| Manganese | 1.00 |
| Chromium | 17.00 |
| Nickel | 12.00 |
| Molybdenum | 2.50 |
| Iron | Balance |

TABLE 4

Constituents to produce AISI 316L by DMA and their properties.

| | Fe (wt. %) | C (wt. %) | Mn (wt. %) | Cr (wt. %) | Ni (wt. %) | Mo (wt. %) | mp (K) | Density at 295 K (g/cm$^3$) |
|---|---|---|---|---|---|---|---|---|
| High Purity Iron | 100 | — | — | — | — | — | 1808 | 7.87 |
| Ferromanganese | 17.5 | 0.5 | 82 | — | — | — | 1540 | 7.20 |
| Low Carbon Ferrochromium | 29.985 | 0.015 | — | 70 | — | — | 1925 | 7.20 |
| Nickel | — | — | — | — | 100 | — | 1730 | 8.91 |
| Ferromolybdenum | 34.90 | 0.10 | — | — | — | 65 | 2175 | 9.00 |

TABLE 5

Proportions of constituents to produce AISI 316L by DMA

| Constituent | Weight Percent |
|---|---|
| High Purity Iron | 58.92 |
| Ferromanganese | 0.94 |
| Low Carbon Ferrochromium | 24.29 |
| Nickel | 12 |
| Ferromolybdenum | 3.85 |
| Total | 100.00 |

The results from selective laser melting (SLM) melt pool tests between a pre-alloy (PA) blend of 316L, DMA blended powder, and base 316L build plate material (certified 316L plate). The melt pool diameter was nominally 2 mm and 0.8-1.2 mm in height from the baseplate. Each layer of powder was 250-μm thick. The melt pool was formed with two layers of powder. Am=n IPG 400-W Yb-fiber 1070-nm laser was used under ultrapure argon in continuous wave mode at ~250 W of laser power over a spot diameter of 403 μm for 4 seconds.

The results in Table 6 showed no statistical difference of the standard deviation of the local composition as measured from the line scans. The DMA samples were as well dispersed, as the pre-alloy and base materials. Each line scan consisted of 1010 data points. Each data point was 0.2 μm in the distance for a total of 201.8 μm. Average percent composition is averaged from line scans D, E, and F for the pre-alloy and DMA samples. The base average percent composition was averaged from line scan A.

TABLE 6

SEM line scan results from DMA, PA, and 316L build plate base material.

| Alloying Element | Material | Average % Composition | Stdev |
|---|---|---|---|
| Cr | DMA | 19.99 | 0.498 |
| | PA | 15.97 | 0.524 |
| | Base | 17.47 | 0.484 |

TABLE 6-continued

SEM line scan results from DMA, PA, and 316L build plate base material.

| Alloying Element | Material | Average % Composition | Stdev |
|---|---|---|---|
| Mn | DMA | 0.89 | 0.291 |
| | PA | 0.80 | 0.262 |
| | Base | 1.86 | 0.404 |
| Mo | DMA | 1.64 | 0.346 |
| | PA | 3.32 | 0.482 |
| | Base | 2.57 | 0.496 |

TABLE 6-continued

SEM line scan results from DMA, PA, and 316L build plate base material.

| Alloying Element | Material | Average % Composition | Stdev |
|---|---|---|---|
| Ni | DMA | 8.23 | 0.585 |
| | PA | 12.49 | 0.555 |
| | Base | 10.31 | 0.576 |
| Si | DMA | 0.76 | 0.235 |
| | PA | 1.34 | 0.233 |
| | Base | 1.04 | 0.226 |
| Fe | DMA | 68.48 | 0.880 |
| | PA | 66.07 | 1.083 |
| | Base | 66.75 | 0.926 |

Example 2

AISI 4340 with the target composition in Table 7 may be fabricated using dry metal alloying using the powdered constituents in Table 8 when mixed in the proportions in Table 9.

TABLE 7

Target chemistry for AISI 4340 alloy steel produced by DMA

| Element | wt. % |
|---|---|
| Carbon | 0.40 |
| Manganese | 0.70 |
| Chromium | 0.75 |
| Nickel | 1.80 |
| Molybdenum | 0.25 |
| Iron | Balance |

TABLE 8

Constituents to produce AISI 4340 and their properties.

| | Fe (wt. %) | C (wt. %) | Mn (wt. %) | Cr (wt. %) | Ni (wt. %) | Mo (wt. %) | mp (K) | Density at 295 K (g/cm$^3$) |
|---|---|---|---|---|---|---|---|---|
| High Purity Iron | 100.0 | — | — | — | — | — | 1808 | 7.87 |
| High Carbon Iron | 95.8 | 4.25 | — | — | — | — | 1420 | 7.87 |
| Ferromanganese | 17.5 | 0.5 | 82 | — | — | — | 1540 | 7.20 |
| Low Carbon Ferrochromium | 29.985 | 0.015 | — | 70.00 | — | — | 1925 | 7.20 |
| Nickel | — | — | — | — | 100 | — | 1730 | 8.91 |
| Ferromolybdenum | 34.90 | 0.10 | — | — | — | 65 | 2175 | 9.00 |

TABLE 9

Proportions of constituents to produce AISI 4340 by DMA

| Constituent | Weight Percent |
|---|---|
| High Purity Iron | 86.53 |
| High Carbon Iron | 9.21 |
| Ferromanganese | 0.94 |
| Low Carbon Ferrochromium | 1.14 |
| Nickel | 1.80 |
| Ferromolybdenum | 0.39 |
| Total | 100.00 |

Different methods of acid digestion will be explored, such as different solvents or microwave-assisted digestion, to increase the percent recovery of Si when digesting SS samples and increase the total mass of metal powder able to be digested. The effect of sample size will be evaluated concerning mix uniformity and determine an appropriate scale of scrutiny. The mechanical properties of deposits will be related to the mix uniformity of an elemental mix to determine a standard % RSD of the concentration of elements from samples extracted from bulk mixes to determine homogeneity. Spherical powders of the same size in blended powders will be evaluated. The effect on mix uniformity will be compared to powders of varying sizes and morphology. The Resodyn Power Equation will be validated. The effect of SPAmix and mixing time on the mix uniformity of an elemental blend will be validated. The relationship of Cr and Ni content will be explored on the predicted and actual ferrite and martensite content. Their relationship will be explored for the hardness of laser-deposited blended powders.

The foregoing description is given for clear understanding only, and no unnecessary limitations should be understood therefrom, as modifications within the scope of the disclosure may be apparent to those with ordinary skill in the art. Throughout the specification, where compositions are described as including components or materials, it is contemplated that the compositions can also consist essentially of, or consist of, any combination of the recited components or materials, unless described otherwise. Likewise, where methods are described as including steps, it is contemplated that the methods can also consist essentially of, or consist of, any combination of the recited steps, unless described otherwise. The disclosure illustratively disclosed herein suitably may be practiced in the absence of any element or step which is not specifically disclosed herein.

The practice of a method disclosed herein, and individual steps thereof, can be performed manually and/or with the aid of or automation provided by electronic equipment.

Although processes have been described with reference to embodiments, a person of ordinary skill in the art will readily appreciate that other ways of performing the acts for the methods may be used. For example, the order of the various steps may be changed without departing from the scope or spirit of the method, unless described otherwise. In addition, some of the individual steps can be combined, omitted, or further subdivided into additional steps.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination. All combinations of the embodiments pertaining to the chemical groups represented by the variables contained within the generic chemical formulae described herein are specifically embraced by the present invention just as if each and every combination was individually explicitly recited, to the extent that such combinations embrace stable compounds (i.e., compounds that can be isolated, characterized and tested for biological activity). In addition, all subcombinations of the chemical groups listed in the embodiments describing such variables, as well as all subcombinations of uses and medical indications described herein, are also specifically embraced by the present invention just as if each and every subcombination of chemical groups and subcombination of uses and medical indications was individually and explicitly recited herein.

All patents, publications and references cited herein are hereby fully incorporated by reference. In case of conflict between the present disclosure and incorporated patents, publications and references, the present disclosure should control.

What is claimed is:

1. A blended powder, comprising 50-96 wt. % iron powder, up to 1 wt. % ferromanganese powder, 1-30 wt. % ferrochromium powder, 1-15 wt. % nickel powder, and up to 5 wt. % ferromolybdenum powder.

2. The blended powder of claim 1, comprising 50-60 wt. % high-purity iron powder, up to 1 wt. % ferromanganese powder, 20-30 wt. % low-carbon ferrochromium powder, 10-15 wt. % nickel powder, and 3-5 wt. % ferromolybdenum powder, wherein the high-purity iron powder comprises at least 99 wt. % iron, and the low-carbon ferrochromium powder comprises 40-100 wt. % chromium, 60-100 wt. % iron, and not more than 0.015 wt. % carbon for a total weight percent of 100 for the low-carbon ferrochromium powder.

3. The blended powder of claim 2, comprising 58.92 wt. % high-purity iron powder, 0.94 wt. % ferromanganese powder, 24.29 wt. % low-carbon ferrochromium powder, 12 wt. % nickel powder, and 3.85 wt. % ferromolybdenum powder, wherein the high-purity iron powder comprises at least 99 w % iron, and the low-carbon ferrochromium powder comprises 40-100 wt. % chromium, 60-100 wt. % iron, and not more than 0.015 wt. % carbon for a total weight percent of 100 for the low-carbon ferrochromium powder.

4. The blended powder of claim 1, comprising 80-90 wt. % high-purity iron powder, 5-10 wt. % high-carbon iron powder, up to 1 wt. % ferromanganese powder, 1-2 wt. % low-carbon ferrochromium powder, 1-2 wt. % nickel powder, and up to 1 wt. % ferromolybdenum powder, wherein the high-purity iron powder comprises at least 99 w % iron, the high-carbon iron powder comprises 95-97 wt. % iron and 3-5 wt. % carbon, and the low-carbon ferrochromium powder comprises 40-100 wt. % chromium, 60-100 wt. % iron, and not more than 0.015 wt. % carbon for a total weight percent of 100 for the low-carbon ferrochromium powder.

5. The blended powder of claim 4, comprising 86.53 wt. % high-purity iron powder, 9.21 wt. % high-carbon iron powder, 0.94 wt. % ferromanganese powder, 1.14 wt. % low-carbon ferrochromium powder, 1.8 wt. % nickel powder, and 0.39 wt. % ferromolybdenum powder, wherein the high-purity iron powder comprises at least 99 w % iron, the high-carbon iron powder comprises 95-97 wt. % iron and 3-5 wt. % carbon, and the low-carbon ferrochromium powder comprises 40-100 wt. % chromium, 60-100 wt. % iron, and not more than 0.015 wt. % carbon for a total weight percent of 100.

6. The blended powder of claim 1, wherein the powders are spherical.

7. The blended powder of claim 1, having a homogeneity index ($HI_{mix}$) of less than 1, wherein $HI_{mix}$ is a ratio of relative standard deviation (RSD) of measured concentration of an element across multiple extracted powder samples (% $RSD_{Mix}$) to a theoretical RSD based on allowable concentration limits set for the element (% $RSD_{C_T}$).

8. A blended powder formed by combining 50-96 wt. % iron powder, up to 1 wt. % ferromanganese powder, 1-30 wt. % ferrochromium powder, 1-15 wt. % nickel powder, and up to 5 wt. % ferromolybdenum powder; and mixing the combined powders to form the blended powder.

* * * * *